United States Patent [19]
Bach et al.

[11] 3,835,120
[45] Sept. 10, 1974

[54] POLYIMIDES OF CONJUGATED AZO DIAMINES
[75] Inventors: Hartwig C. Bach; Helmut E. Hinderer, both of Pensacola, Fla.
[73] Assignee: Monsanto Company, St. Louis, Mo.
[22] Filed: Oct. 15, 1973
[21] Appl. No.: 406,449

Related U.S. Application Data
[63] Continuation of Ser. No. 779,244, Nov. 26, 1968, abandoned.

[52] U.S. Cl....... 260/47 CP, 117/124 E, 117/128.4, 117/138.8 A, 117/148, 117/155 R, 161/214, 161/227, 260/2.5 N, 260/30.2, 260/30.8 R, 260/30.8 DS, 260/32.6 N, 260/65, 260/78 TF
[51] Int. Cl............................................ C08g 20/32
[58] Field of Search......... 260/47 CP, 65, 78 TF, 50

[56] References Cited
UNITED STATES PATENTS
3,455,879  7/1969  Gay et al. ............................ 260/47

Primary Examiner—Lester L. Lee
Attorney, Agent, or Firm—John W. Whisler

[57] ABSTRACT

A class of ordered fiber and film forming aromatic polyamide acids and corresponding polyimides derived from symmetrical conjugated and pseudo-conjugated aromatic azo diamines have been found to possess excellent thermal, mechanical and electrical properties useful in fibers, films and other shaped articles.

7 Claims, No Drawings

POLYIMIDES OF CONJUGATED AZO DIAMINES

CROSS-REFERENCE TO RELATED APPLICATION

This is a continuation of application Ser. No. 779,244 filed Nov. 26, 1968, now abandoned.

BACKGROUND OF THE INVENTION

This invention relates to a novel class of polyamide acids, the corresponding polyimides and to fibers, films and other shaped articles derived therefrom.

More particularly, the invention relates to the preparation of fiber and film forming polyamide acids and polyimides from a particular class of symmetrical conjugated or psuedo-conjugated aromatic azo diamines.

The ordered azo aromatic polyamide acids and polyimides of this invention can be prepared by conventional polymerization and cyclization techniques to provide products having improved electrical, mechanical and thermal properties.

Accordingly, it becomes an object of this invention to provide for a new class of ordered, conjugated or psuedo-conjugated, aromatic azo polymers containing imide linkages.

These and other objects will become apparent to those skilled in the art from the ensuing description.

SUMMARY OF THE INVENTION

The novel fiber and film-forming polyamide acids and polyimides of this invention are respectively represented by the following structural formulas,

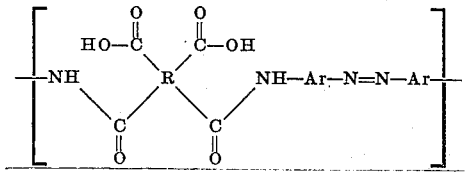

and

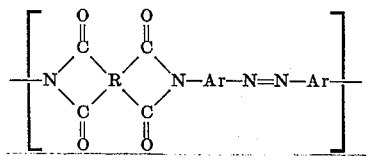

where R represents a tetravalent aromatic radical having paired valence bonds on adjacent cyclic carbon atoms and Ar represents a conjugated or pseudo-conjugated divalent aromatic radical.

The polyamide acids above described may be conveniently prepared by the polymerization of an aromatic acid dianhydride with diamines hereafter described whereupon the thus formed polyamide acids can be thermally or chemically dehydrated to form the corresponding polyimides.

DESCRIPTION OF THE INVENTION

The symmetrical diamine reactants employed in the preparation of the novel polymers of this invention are represented by the formula $NH_2-Ar-N=N-Ar-NH_2$ wherein Ar represents a conjugated or psuedo-conjugated divalent aromatic radical which may be a single ring, a fused ring or a multi-nuclear aromatic ring system which can be carbocyclic or heterocyclic. The aromatic ring systems are those characterized by having benzenoid unsaturation which exhibit resonance in the classic sense, including radicals derived from benzene naphthalene or psuedo-conjugated bridged diphenyls such as diphenyl sulfone and diphenyl ether. The heterocyclic radicals may contain one or more hetero-atoms such as $-O-$, $-S-$, $-N=$, representative of which are those derived from pyridine, oxadiazole, thiazole, imidazole, pyrimidine and the like. Where Ar represents a multi-ring system the rings may be connected only through aromatic carbon to aromatic carbon valence bonds or through pseudo-conjugating groups such as $-O-$, $-S-$,

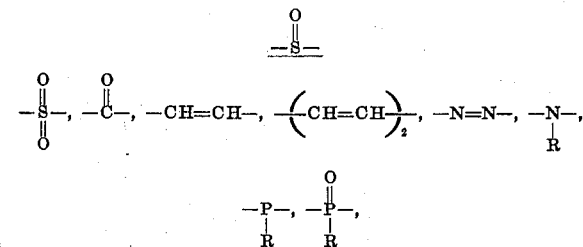

wherein R represents a lower alkyl radical and others which result in psuedo-conjugation.

The term, pseudo-conjugation, as here employed connotes those radicals which reflect the influence of conjugation even though conjugation in the classic sense is disrupted by the presence of certain pseudo-conjugating groups such as those above mentioned. The presence of such groups does not disrupt the influence of conjugation and allows internal electronic interaction characteristic of true conjugation. For example, the radical

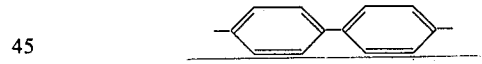

is truly conjugated in the classic sense and is capable of electronic interaction whereas, the radical

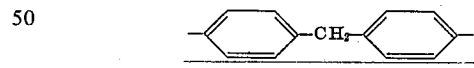

is not conjugated and does not permit internal electronic interaction. Yet radicals such as

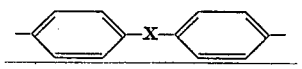

where X is a pseudo-conjugating group of the type above-mentioned the radical is capable of internal electronic interaction characteristic of a truly conjugated radical and is termed herein, psuedo-conjugated. A symmetrical aromatic azo diamine of this invention is conjugated or pseudo-conjugated if the basicity of a remaining amine group of the diamine is altered after neutralization of a first amine group with an acid such as HCl.

Typical examples of the diamines (I) useful in the preparation of diamine monomers (II) by the process of this invention include the following:

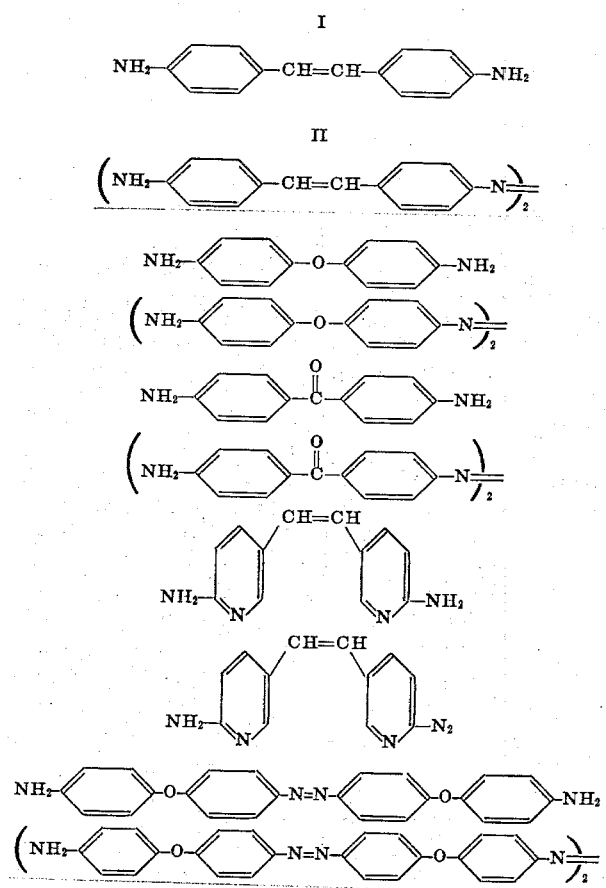

The reactant diamines employed to prepare the azo diamines used in this invention are generally known in the art and can be prepared by means already known to those skilled in the art.

The symmetrical, conjugated or pseudo-conjugated, aromatic azo diamines employed in the process of this invention can be prepared by the oxidative coupling of symmetrical aromatic diamines in solution, utilizing a cupric ion complexed with a nitrogen base. Preferably, the oxidative solution dimerization is conducted as a catalytic process with a cupric-cuprous redox couple complexed with a nitrogen base as the catalyst, a nitrogen base as the solvent and molecular oxygen as the primary oxidant.

The active catalyst system is preferably obtained by oxidation of a cuprous salt in the presence of a nitrogen base, although some cupric salts such as cupric acetate may also be used. Any cuprous salt may be used in the practice of this invention provided that it forms a complex with the nitrogen base that is soluble in the reaction medium and that it is capable of existing in the cupric state. The particular salt used has no effect on the type of product obtained. Typical examples of cuprous salts suitable for the process are cuprous chloride; cuprous bromide, cuprous sulfate, cuprous acetate, cuprous benzoate and the like. The use of cupric salts is generally less desirable in the catalyst preparation although cupric acetate is quite effective.

It is beilieved that cupric ion complexed with a nitrogen base, complexes with the amino groups of the starting diamine, then oxidizes them and aids in the coupling of the resulting species. During this reaction cuprous salt or complex is formed which is reoxidized by oxygen (or its precursors such as $H_2O_2$) to the cupric state. Based on this mechanism, chemical oxidants also appear to be useful which can oxidize the cuprous ion to the cupric ion.

Since the reaction does not destroy the catalyst, only a small catalytic amount of cuprous or cupric salt needs to be used, from about 0.1 to 10 mole percent, based on the moles of aromatic diamine to be oxidized, although larger amounts can be used, as desired.

Nitrogen bases which may be used as a component of the catalyst as well as the reaction medium include all nitrogen bases except those which are oxidized by the catalyst. It is preferred to have the basicity of the nitrogen base as close as possible to that of the primary diamine starting material in order to help the reaction proceed at the most optimum rate and give better yields.

Suitable nitrogen bases include various amides such as phosphoramides, carbonamides and sulfonamides. Examples of such amides are hexamethylphosphoramide, dimethylacetamide, dimethylformamide, dimethylpropionamide, diethylacetamide, N-acetylpyrrolidone, N-ethyl pyrrolidone and the like. Of these amide bases, dimethylacetamide and hexamethylphosphoramide are generally preferred.

Other nitrogen bases, suitable for carrying out the process of this invention, include aliphatic tertiary amines such as triethylamine, tributylamine, diethylmethylamine, and cyclic amines such as pyridine, n-alkyl piperidines, quinolines, isoquinolines, N-alkyl morpholines and the like. Among these, pyridine is preferred.

Mixtures of bases which form a part of the catalyst system may also be used. They may also be used in combination with compounds which act only as the reaction medium. For example, nitrobenzene is a good reaction medium, and may be used in combination with one of the aforementioned bases. Other inert solvents which do not interfere with the catalyst or are not oxidized to any appreciable extent by it may also be used as the reaction medium. It was found, in the course of this work, that reaction media in which the products of the reaction are relatively insoluble lead to a cleaner, simpler separation of product from catalyst and by-products, thus increasing the yield of symmetrical diamine obtained.

In a preferred mode of operation of the process, molecular oxygen is used as the primary oxidant and may be introduced into the reaction medium by diffusion or injection. Either 100 percent oxygen or gas mixtures containing oxygen may be used. In addition, other compounds capable of supplying oxygen, such as hydrogen peroxide may be used.

The order of addition of the various reactants is not critical. In one preferred mode of carrying out this invention, the catalyst may be prepared by oxidizing cuprous chloride in a base such as pyridine. The symmetrical primary aromatic diamine is then added and oxidatively coupled by the addition of oxygen until about the theoretical volume has been consumed.

Alternatively, the catalyst may be prepared in the same manner as described above and then added to a chilled solution of the primary aromatic diamine in the appropriate reaction medium, prior to the addition of oxygen. In either case, the amount of oxygen consumed can be measured with great accuracy, by using a closed system and a gas buret.

The preparation of the catalyst and the oxidative coupling reaction may be carried out in the temperature range of from about −30°C. to about 120°C., preferably from about −20° to about 70°C. It has been found that the catalyst preparation may be carried out conveniently and preferably at room temperature. The rate of reaction is satisfactory at these temperatures and a very efficient catalyst is produced.

The surprising feature of the oxidative coupling reaction is that the dimer product obtained is essentially the only product resulting from the process. The selective oxidation of one amino group of the symmetrical diamine, to the exclusion of the other amino group, which is equally reactive, is indeed unexpected.

Although the exact reason for this selectivity is unknown, it is believed that the amino groups of the conjugated diamine product are less basic than those of the starting material, due to the increased degree of conjugation. Thus, the catalyst reacts preferentially with the more basic amino groups of the starting materials, as long as they are present in the mixture. This theory is further strengthened by the fact that greater care must be taken in controlling the reaction conditions, as the difference in basicity of the starting material and product becomes smaller, in order to obtain high yields of pure dimer.

Determination of the basicities of the amino groups of the starting diamine and the product can be helpful in predicting suitable conditions for carrying out the reaction. In general, as the difference in basicity between the amino groups of the starting material and product increases, the range of reaction conditions which can be used satisfactorily in the practice of this invention is broadened; conversely, as the difference in basicity becomes smaller, the range of conditions is narrowed.

The optimum reaction conditions to be used for carrying out the process will be dependent in large part on the structure and molecular weight of the starting material and final product. These conditions may be easily optimized by those skilled in the art.

The preparations of several symmetrical conjugated and pseudo-conjugated diamines are hereinafter illustrated in greater detail.

The ordered condensation polymers of this invention may be prepared by reacting an azo-aromatic diamine, above described, with an aromatic acid dianhydride. Suitable aromatic acid dianhydrides, which may be used, are those generally known in the art and represented by the general formula:

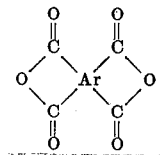

The preferred aromatic acid dianhydrides, suitable for use in the present invention, are those in which the four carbonyl groups of the anhydride are each attached directly to separate carbon atoms in the aromatic ring, and wherein the carbon atoms of each pair of carbonyl groups is attached to adjacent carbon atoms in the aromatic ring, resulting in the formation of a five membered ring.

Examples of aromatic acid dianhydrides which may be used to prepare the polymers of this invention include: pyromellitic dianhydride; 2,3,6,7-naphthalene tetracarboxylic dianhydride; 3,4,3',4'-diphenyltetracarboxylic dianhydride; bis(3,4-dicarboxyl phenyl)-sulfone dianhydride; benzene-1,2,3,4-tetracarboxylic dianhydride; 1,1-bis(3,4-dicarboxyl phenyl)methane dianhydride; pyrazine-2,3,5,6-tetracarboxylic dianhydride; 1,1-bis(3,4-dicarboxyl phenyl)ether dianhydride; and the like.

Examples of the ordered polyimides of this invention, obtainable by the reaction of the above described conjugated azo-aromatic diamines and aromatic acid dianhydrides and embraced by the general formulas previously shown include the following:

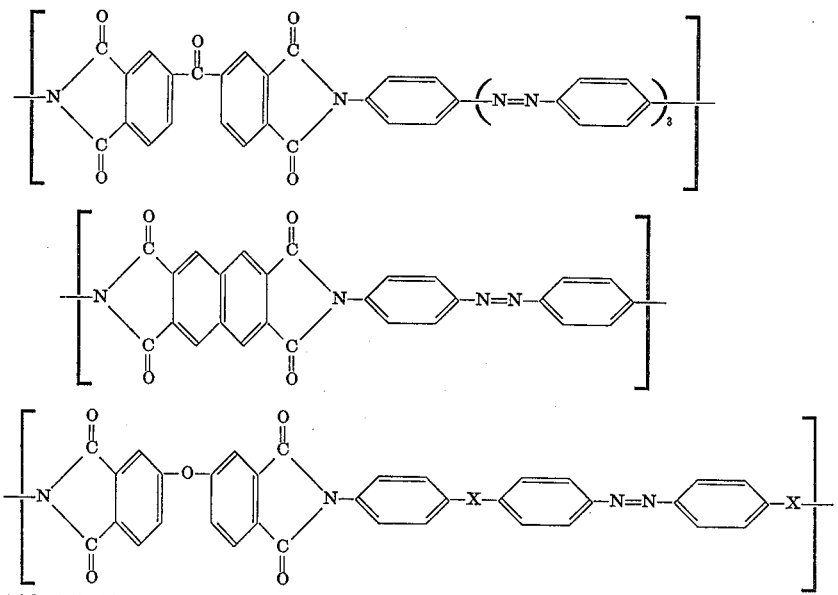

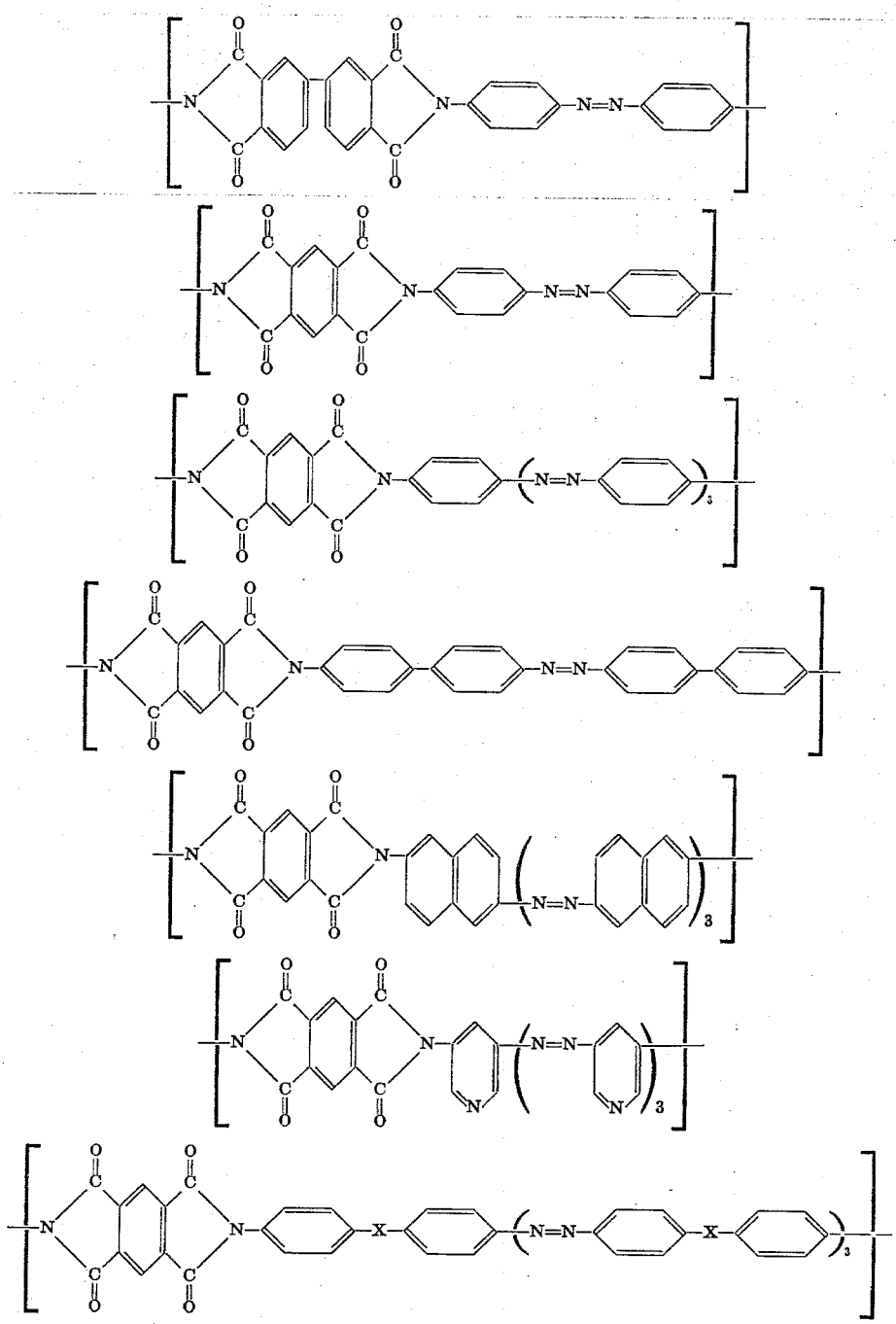

where X has the meaning above indicated.

In a preferred method for the preparation of the polyimides of this invention, a polyamide-acid is first prepared by the reaction of at least one of the aforementioned diamines with at least one tetracarboxylic acid dianhydride in an organic solvent for at least one of the reactants, the solvent being inert to the reactants. Preferably, the reaction is carried out under substantially anhydrous conditions for a period of time and at a temperature sufficient to result in complete reaction. The polymerization reaction is very sensitive to the stoichiometric equivalence of the diamine and dianhydride and in order to obtain high molecular weight polyamide-acid, essentially equivalent molar amounts of the reactants should be used. For most purposes, the polyamide acid should have an inherent viscosity of at least 0.1, and preferably 0.3–0.5, as measured as a 0.5 percent solution at 30°C. in a suitable solvent, for satisfactory conversion to the polymers of this invention. Otherwise stated the number of repeat or recurring units in the polymer chain should reflect viscosities sufficient to enable the formation of fibers, films or other shaped articles for which the polymers find use.

The polyamide acid may then be converted to the corresponding polyimide by a heat treatment or chemically by treatment with any of the dehydrating systems used for such purposes, such as, for example, acetic anhydride in pyridine. It is generally preferable to form the desired shaped structure from the polyamide acid composition prior to conversion to the polyimide. However, a partial conversion to the polyimide structure, prior to forming the shaped article, is sometimes desirable and preferable. It has been found that a reaction product containing a polymeric component of at least 50 percent polyamide-acid will usually be sufficient to give a shapable composition.

The solvents useful for synthesizing the intermediate polyamideacid compositions in the preferred method for preparing the polyimides of this invention must not react with either of the reactants (i.e., diamine or dianhydride) to any appreciable extent. Besides being inert to the reactants, and preferably being a solvent for the product, the organic solvent used must be a solvent for at least one and preferably both of the reactants. The preferred solvents are the lower molecular weight members of the N,N-dialkylcarboxylamide class such as for example, N,N-dimethylformamide, N,N-dimethylacetamide and N,N-diethylformamide. Other suitable solvents which may be used are dimethylsulfoxide, dimethylsulfone, hexamethylphosphoramide, N-methyl-2-pyrrolidone and formamide. The solvents may be used alone, or in combination with poor solvents such as benzene or hexane, in some cases, without any adverse effect on the results.

The optimum time and temperature for forming the polyamide-acid of a specified diamine and dianhydride will depend on a number of factors, such as temperature, solvent used, and the concentration and solubility of the reactants and product. For best results, it is generally preferable to carry out the reaction at a temperature close to the maximum permissible for the given system. The maximum permissible temperature will depend on the number of factors among which are the diamine and dianhydride used, the solvent, the concentration of polyamide-acid desired in the final composition, the minimum time desired for completion of the reaction. The optimum temperature will vary with the reactants and other conditions but may be easily determined experimentally. In order to obtain the maximum degree of polymerization for any given combination of diamine and dianhydride it has been found that the temperature should be maintained below 60°C. and preferably below 50°CC. during the reaction.

Since the reaction is exothermic and tends to accelerate rapidly, it is sometimes necessary, particularly in the case of large scale preparations, to regulate the rate of polymerization in order to maintain the reaction temperature at the desired level. A relatively simple means for providing control of the temperature and rate of the reaction, involves premixing equimolar amounts of the diamine and dianhydride and then adding this mixture in small increments with agitation to the solvent. Alternatively, the diamine may be dissolved in the solvent and the dianhydride added in small amounts and at a rate which permits control of the reaction. Or the diamine may be dissolved in one portion of solvent, the dianhydride in another portion of the same or another solvent and the polymerization controlled by mixing the two solutions at the required rate with stirring.

The quantity of solvent used may vary from the minimum amount needed to dissolve enough of the diamine to initiate the reaction, to an amount which will result in very dilute polymer solutions. The final concentration of polymer in solvent may vary over a considerable range and will depend on the requirements for forming shaped articles, the degree of polymerization and the amount of polyamide-acid in the composition. For best results, the solution may contain from 1 to 40 percent of the polymeric component. A concentration of about 5 to 15 percent is generally best for fiber formation, whereas a concentration of 40 to 50 percent may be required for best results in forming shaped articles such as bearings or gears from these compositions.

The degree of polymerization of the polyamide-acid may be easily controlled and maintained at the desired level, by properly adjusting the stoichiometry of the reaction. Very high molecular weight polymers may be obtainable by using equal molar amounts of the reactants; whereas the use of an excess of either reactant limits the molecular weight obtainable.

As previously mentioned, the polyamide-acids of this invention may be converted to the corresponding polyimide by a heat treatment or by a chemical treatment. Heating may be carried out at temperatures above 50°C. and, preferably above 100°C., for periods of from several minutes to several hours. Heating serves to convert pairs of amide and carboxylic acid groups to imide groups by the elimination of water. The optimum time-temperature conditions for conversion of a given polyamide-acid to the corresponding polyimide will depend on the structure of the polyimide. These conditions may be readily determined by a few well chosen experiments. It has been found that after completion of the conversion at lower temperatures, the thermal and hydrolytic stability of most of these polyimides may be improved by a further heat treatment at 300–500°C. for 10–20 seconds.

The polyamide-acid polymers may also be converted to polyimides by a chemical treatment which usually involves treating the polymer with a dehydrating agent alone, or preferably in combination with a catalyst. For example, polyamide-acid films may be treated in a bath containing an acetic anhydride-pyridine mixture. The ratio of acetic anhydride to pyridine, as well as the temperature of treatment may vary over a wide range. Other dehydrating agents which may be used include propionic anhydride and butyric anhydride; and other catalysts which may be used include other tertiary amines such as triethylamine and quinoline. In some cases, it may be preferable to carry out the conversion to polyimides by a combination of a heat treatment and a chemical treatment. For example, partial conversion may be attained by a chemical treatment and the conversion then completed by a subsequent heat treatment or vice versa.

Shaped articles, derived from these polymers, possess excellent properties at room temperature and display a resistance toward various types of degradation that is unique for an organic polymer. The outstanding characteristic of shaped articles, derived from these polymers, however, is the retention of their electrical and physical properties as well as stability, on exposure to elevated temperatures for prolonged periods of time. The outstanding properties of the polyimides of this invention, relative to those of other aromatic polyimides of similar structure, is believed to be due to the conjugation of pseudo-conjugation of these polymers.

The polymers of this invention may be used in a wide variety of applications, either alone, such as, for example, in coatings, films, fibers, foams or resins; or in combination with other materials, such as, for example in reinforced plastics, laminated structures, composites, etc.

Solutions of the polyamide-acids of this invention may be applied as a coating composition to a wide variety of materials such as metals, glass, wood, paper and synthetic polymers, in the form of wires, sheets, fibers, foams, fabrics, etc. The coatings may be then converted to polyimide coatings by one of the methods previously described. Because of their excellent electrical properties and heat resistance, these polymers may be especially useful as electrical coatings. Because of this conjugated structure, these polymers may be particularly suited in some cases for use in semiconductors.

Solutions of the polyamide-acids of this invention may also be spun into fibers of filaments by conventional dry or wet spinning techniques and subsequently converted into polyimides by a chemical or heat treatment. In fiber form, the polymers of this invention may be especially useful for high temperature electrical insulation, protective clothing and filtration media.

Films of varying thickness may be cast from the polyamide-acid solutions of this invention using well known procedures. These films can then be coverted into polyimide films by one of the previously described techniques. The film can be used in wrapping and packaging applications, such as for wrapping corrosion resistant pipe and cables, container linings, and protective bags; for high temperature insulation such as in transformers, capacitors, and motors; for laminated structures, such as metal sheets or strips and flat wire; and for electrical printed circuits. The moderately high dielectric constant and low dissipation factor make these films especially useful as high temperature dielectrical materials.

Foams, derived from the polymers of this invention, may be prepared by introducing blowing agents, air, or carbon dioxide into the polyamide-acid polymer solutions with vigorous agitation and subsequently adding a converting agent or catalyst. The mixture may then be shaped into the desired form by casting on a smooth surface of placing in a mold, and then converted to a polymide foam by drying and heating. Typical uses of the foamed products derived from the polymers of this invention are in various types of insulation for appliances, heat shields, firedoors, etc,; in laminating other materials; in films, and other uses requiring a combination of good dielectric properties and flame resistance.

Resins may be prepared from these polymers which may be useful in the fabrication of gaskets, piston rings, bearings, and as a binder, due to their high abrasion resistance and resistance to creep and cold flow.

It should be understood that the polymers of this invention may be mixed with other inert materials prior to shaping, in which case they make excellent binders for composite structures.

The following examples illustrate several embodiments of the invention and are not intended to define the limits and scope thereof.

EXAMPLE I

Poly(pyromellitimide) of 4,4'-diaminoazobenzene

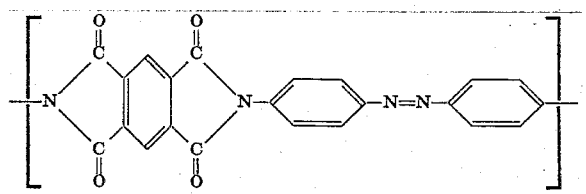

At 0°C., 0.55 g. (0.0025 mole) of pyromellitic dianhydride was added to a solution of 0.53 g. (0.0025 mole) of 4,4'-diaminoazobenzene in 9.7 ml. of dimethylacetamide (DMAc). The mixture was stirred at 0°C. for 2 hrs., then at ambient temperature. The polyamic acid in the dope had an inherent viscosity of 2.97 (0.5 percent polymer in DMAc, 30°C.). Films were cast from a viscous polyamic acid solution. The films were converted to the polyimide by curing at 140°C. and then at 300°C. A film of this composition retained its flexibility for 13 days upon being heated at 300°C. in air.

EXAMPLE II

Poly(benzophenone tetracarboxylic acid imide) of 4,4'-diaminoazobenzene

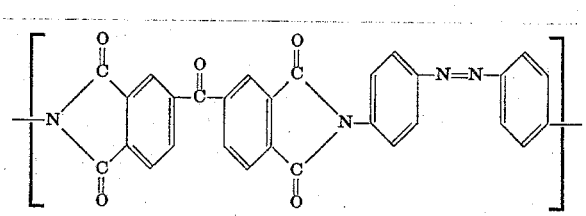

At 0°C., 0.805 g. (0.0025 mole) of benzophenone tetracarboxylic acid dianhydride was added to a solution of 0.53 g. (0.0025 mole) of 4,4'-diaminoazobenzene in 9.8 ml. of DMAc. The mixture was stirred for 2 hrs. at 0°C., then at ambient temperature for 42 hrs. The poly-(amic acid) in the dope had an inherent viscosity of 1.5 (0.5 percent of polymer in DMAc, 30°C.). Several films were cast from the viscous dope. The polyamide acid films were thereafter converted to polyimide by heating to 300°C.

EXAMPLE III -bis(p-aminophenylazo)azobenzene

Poly(pyromellitimide) of 4,4'-bis(p-aminophenylazo) azobenzene

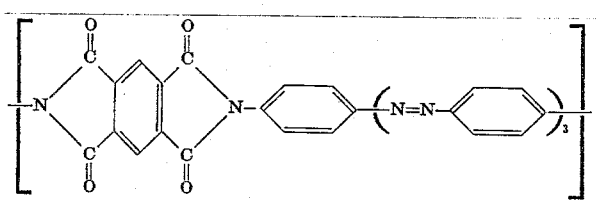

At 0°C., 0.22 g. (0.001 mole) of pyromellitic dianhydride was added to a solution of 0.42 g. (0.001 mole) 4,4'-bis(p-aminophenylazo)azobenzene in 4.5 ml. of DMAc. The mixture was stirred for 2 hours at 0° C., then at ambient temperature. A film was cast from the viscous dope which was strong and flexible after successive curing at 140°C. and 300°C. The poly(amic acid) in the dope had an inherent viscosity of 2.7 (0.5 percent concentration of polymer in DMAc, 30°C.). A fiber was spun from a similar dope. After curing the polyimide fiber had the following properties: tenacity 75,000 psi (3.9 g/den), elongation 2.2 percent, modulus $5.5 \times 10^6$ psi (288 g/den). A film of the polyimide composition retained its flexibility upon being heated to 300°C. in air for 12 days.

EXAMPLE IV

Poly(benzophenone tetracarboxylic acid imide) of 4,4'-bis(p-aminophenylazo)azobenzene

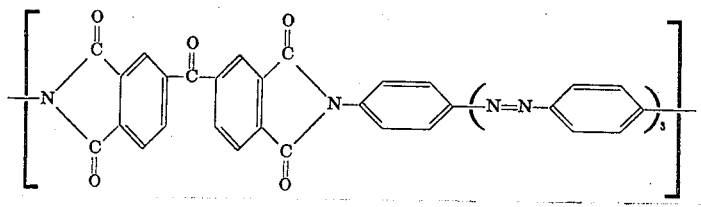

At 0°C., 0.32 g. (0.001 mole) of benzophenone tetracarboxylic acid dianhydride was added to a solution of 0.42 g. (0.001 mole) of 4,4'-bis(p-aminophenylazo)azobenzene in 4.5 ml. of DMAc. The mixture was stirred for 2 hours at 0°C., then at ambient temperature. Several films were cast from the viscous dope. The films were cured by reaction with pyridine/acetic anhydride (3:2), then heating 140°C. and 300°C. The resulting red polyimide films were strong and flexible. The poly(amic acid) dope had an inherent viscosity of 1.7 (0.5 percent concentration of polymer in DMAc, 30°C.).

EXAMPLE V

Poly(pryomellitimide) of 4,4'-bis(4-aminophenyl)azobenzene

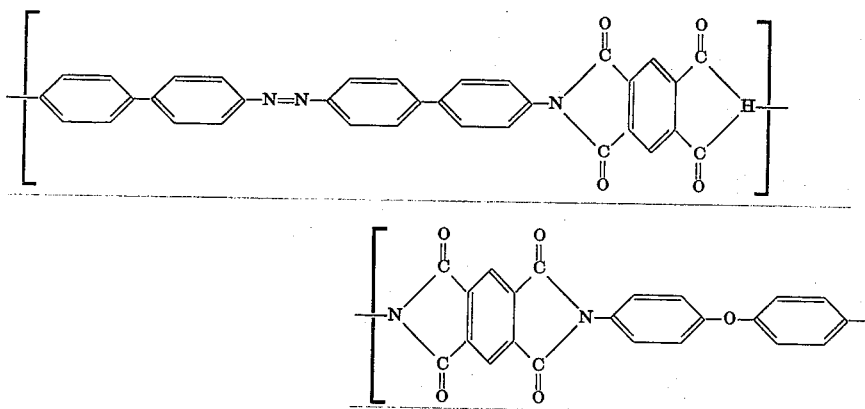

Pyromellitic dianhydride (0.44 g., 2 m moles) was added to a chilled solution of 4,4'-bis(4-aminophenyl)azobenzene in DMAc (15 ml.). The condensation was conducted at 0° for 4 hours and then at ambient temperature. The inherent viscosity of the polyamic acid at 30° was 1.68 (0.5 percent concentration of polymer in DMAc, 30°C.). The red dope was cast into a film dried initially at 95°C. for 1 day, then at 140° for 15 hours and finally cured at 300°C. for 1 hour. The orange-brown film was transparent and had fair strength, but was slightly brittle.

EXAMPLE VI

Polyimide of 4,4'-bis(4-aminophenyl)azobenzene with benzophenonetetracarboxylic acid dianhydride

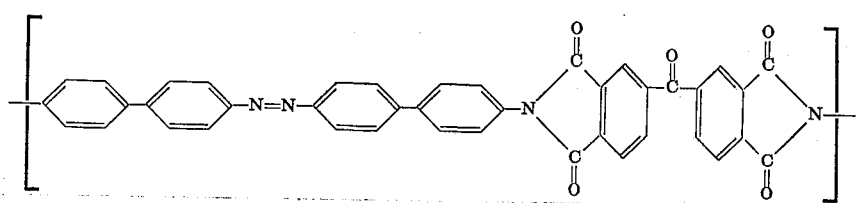

To a chilled solution of 1.09 g. (3 m moles) of 4,4'-bis(4-aminophenyl)azobenzene in 13 ml. of DMAc was added 0.97 g. (3 m moles) of benzophenone tetracarboxylic acid dianhydride. The cooling bath was removed after 4 hours and the reaction was allowed to proceed at room temperature for 14 hours. The inherent viscosity of the polyamic acid was 1.35 (0.5 percent concentration of polymer in DMAc, 30°C.). The red dope was cast into a film which was dried at 100° for 2 hours, then was heated at 140° for 2 hours and finially at 300° for 1 hour to convert it to the polymide. The orange-brown film was transparent, strong and flexible.

EXAMPLE VIII

Poly-pyromellitimide) of 4,4'-bis(4-aminophenoxy)azobenzene

To a chilled solution of 1.98 g. (5 m moles) of 4,4'-bis(4-aminophenoxy)-azobenzene in 32 ml. of DMAc was added 1.09 g. (5 m moles) of pyromellitic dianhydride. The ice-water bath was removed after 1 hour and the dope was stirred overnight at room temperature. The inherent viscosity of the polyamic acid at 30°C. was 2.22 (determined on a portion of dope diluted to 0.5 percent). Films were cast with initial drying at 100° for one-half hour. Conversion of samples of film to the polyimide was effected thermally by heating at 140°C. for 17 hours and at 300°C. for 1 hour and chemically by soaking in an acetic anhydride/pyridine solution (3/2 by volume) overnight. The light brown films were transparent, strong, flexible and could be drawn at elevated temperatures (e.g., 1.67 X at 355°) with apparent gain in strength.

EXAMPLE IX

Poly(benzophenonetetracarboxylic acid imide) of 4,4'-bis(4-aminophenoxy)azobenzene

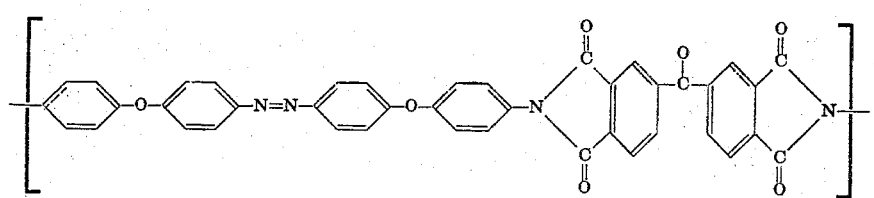

Benzophenonetetracarboxylic acid dianhydride (BTDA) (0.805 g., 2.5 m moles) was added to a cold solution of 4,4′-bis(4-aminophenoxy)azobenzene (0.990 g., 2.5 m moles) in 14 ml. of DMAc. The condensation proceeded at 9° for 3 hours and at room temperature for 20 hours. The inherent viscosity of the polyamic acid at 30° was 1.42 (0.5 percent concentration of polymer in DMAc). Films were obtained by drying the dope spread on glass plates at 100° for one-fourth hour. Conversion to the polyimide was effected by thermal treatment along by drying at 140°C. for 16 hours and at 300°C. for 1 hour and chemically by soaking in a solution of acetic anhydride/pyridine (3/2 by volume) overnight. The light brown polyimide films were transparent, strong, flexible and hot-drawable at elevated temperatures (e.g. 1.64 × at 340°C.) with apparent gain in strength.

EXAMPLE X

Poly(pyromellitimide) of 4-amino-4′-(4-aminophenylazo)azobenzene

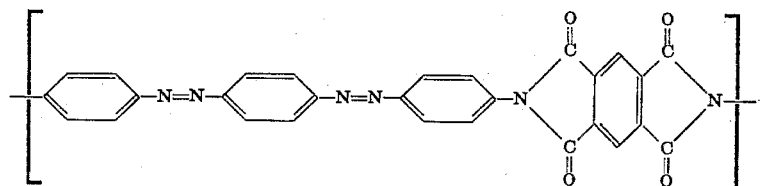

Pyromellitic dianhydride (0.436 g., 2 m moles) was added to a chilled mixture of 0.633 g. (2 m moles) of 44′4′-(4-aminophenylazo)azobenzene in 8 ml. of DMAc. The ice-water bath was removed after 4 hours and reaction continued at room temperature overnight. The inherent viscosity of the polyamic acid was 1.50 at 30°. The dark red dope was cast into films which were dried initially at 100°C. for 1 hour, then were cured at 140°C. for 20 hours and at 300°C. for 2 hours to effect conversion to the imide. The red-brown transparent film had fair strength and flexibility and could be hot drawn (e.g., 1.20 × at 460°C.) with apparent gain in stngth.

EXAMPLE XI

Poly(benzophenonetetracarboxylic acid imide) of 4-amino-4′-(4-aminophenylazo)azobenzene

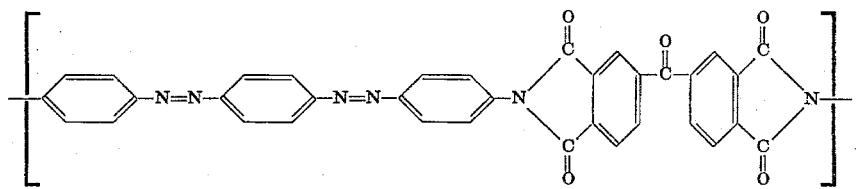

To a chilled solution of 0.633 g. (2 m moles) of 4-amino-4′-(4-aminophenylazo-azobenzene in 7 ml. of DMAc was added 0.644 g. (2 m moles) of BTDA. The polymerization was conducted at 0° for 5 hours, then overnight at room temperature. The inherent viscosity of the polyamic acid at 30° was 1.06 (0.5 percent concentration of polymer in DMAc). The dark red dope was cast into film which was dried initially at 100°C. for 1 hour, then was cured at 140°C. for 20 hours and 300°C. for 2 hours to convert to the polyimide. The red-brown, transparent film had good strength and flexibility; it could be drawn at elevated temperatures (e.g. 2.34 × at 345°) with apparent gain in strength.

We claim:

1. A film-and filber-forming polyamide acid consisting essentially of recurring structural units of the formula

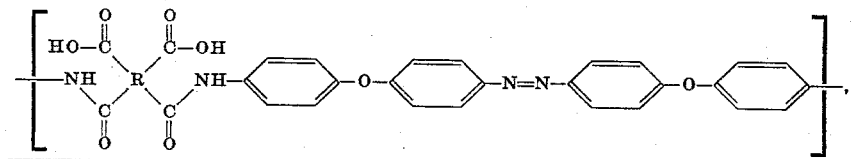

wherein R is selected from the group consisting of

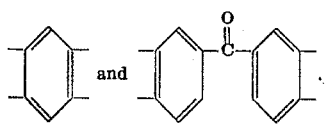

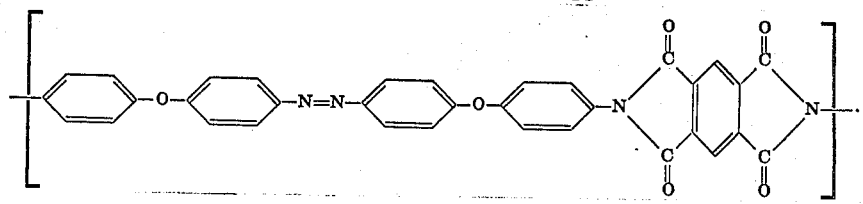

2. A polyimide consisting essentially of recurring structural units of the formula

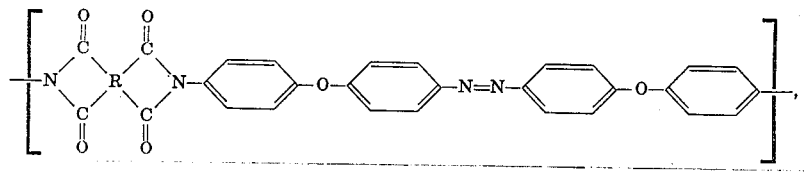

wherein R is selected from the group consisting of

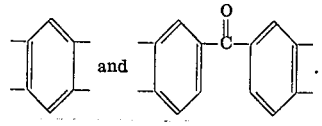

3. The polyimide of claim 2 consisting essentially of

4. The polyimide of claim 2 consisting essentially of

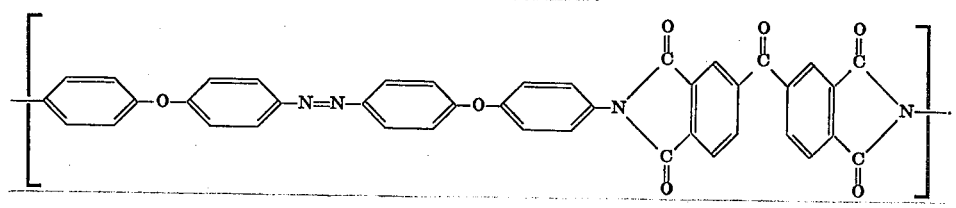

5. A film consisting essentially of the polymer of claim 1.

6. A film consisting essentially of the polymer of claim 2.

7. A fiber consisting of the polymer of claim 2.

* * * * *